United States Patent [19]

Halpern

[11] 3,748,441
[45] July 24, 1973

[54] FARE CHARGING APPARATUS FOR PUBLIC TRANSPORT SYSTEMS

[76] Inventor: John Wolfgang Halpern, 10 Gilroy House, Lancaster Gate, London, W.2., England

[22] Filed: June 16, 1970

[21] Appl. No.: 48,905

Related U.S. Application Data

[63] Continuation of Ser. No. 442,726, March 25, 1965, abandoned.

[30] Foreign Application Priority Data
Mar. 27, 1964 Great Britain ..................... 8,147/64

[52] U.S. Cl. ...................... 235/61.6 R, 235/61.8 A
[51] Int. Cl. ............................................. G06k 7/00
[58] Field of Search ................. 235/61.8 R, 61.8 A, 235/61.7, 61.6; 340/149 R, 149 A, 51

[56] References Cited
UNITED STATES PATENTS
2,783,865   3/1957   Cleave ........................... 235/61.8 A
2,907,521   10/1959  Cunningham ........................ 235/99

Primary Examiner—Daryl W. Cook
Attorney—Bertram I. Rowland

[57] ABSTRACT

Fare charging apparatus for public conveyances using a fare card which has data recorded thereon which can be sensed by the apparatus electrically, stored, compared to point of departure apparatus, fare computation made, and the results thereof recorded on the card, which is then returned to the user.

9 Claims, 5 Drawing Figures

INVENTOR
JOHN W. HALPERN

Fig.5

FARE CHARGING APPARATUS FOR PUBLIC TRANSPORT SYSTEMS

This application is a continuation of application Ser. No. 442,726, filed Mar. 25, 1965 and now abnadoned.

This invention relates to fare charging apparatus for public transport systems in which passengers use separate entry and exit points with respect either to vehicles or stations.

Various proposals have been made in the past to improve the efficiency of fare charging systems by the elimination of conductors or ticket offices and by the introduction of automatic or semi-automatic machines. In one proposal, coin operated payment machines were to be provided on the vehicles themselves but this system tends to fail on high density routes and during rush hours, due to hold-ups at the machines. Another proposal was the introduction of prepaid tickets for unit fares, the tickets being machine checked on entry. This system is, however, only applicable to one type of passenger and has disadvantages where several types of passenger, as will hereafter be described, are to use the system. A still further proposal was the provision of a travel credit card in the form of punched cards having a code thereon corresponding to the ticket owner. These cards were to be registered at both entry and exit and the data thus obtained recorded on tapes which then provide information for a central accounting and processing system which issued periodical travel accounts to the ticket owner. This system is, however, only applicable to travellers using the particular transport system regularly and would not cope with casual travellers.

The present invention seeks to provide fare charging apparatus for casual travellers which enable the traveller to pay for each journey on leaving the transport system, which apparatus assists in speeding up passenger flow.

The present invention can be adapted to operate with other types of passenger as well.

In general the potential needs of travellers using a public transport system are such that the travellers may be divided into three main types.

a. The casual traveller

This type of traveller prefers, for various reasons, to pay for each journey separately. This is often due to his infrequent use of the system, as would be the case of a visitor, or to the preference for paying as he uses without the necessity of spending lump sums on prepaid tokens.

b. The account traveller

This type of traveller makes frequent use of the transport system but does not wish to bother with paying for individual journeys and prefers to have an account rendered to him periodically.

c. The prepaid traveller

This type of traveller also makes frequent use of the transport system but prefers to operate on a prepayment system and to purchase multi-journey tokens renewable when their value has been used.

Thus the apparatus of the present invention seeks to provide facilities for casual travellers but is adaptable to provide facilities also where required for the latter two types as well.

According to the invention there is provided a fare charging apparatus for public transport systems in which passengers use separate entry and exit points with respect either to vehicles or stations, which apparatus comprises a first entry registration unit for issuing tokens and recording thereon the fare stage zone of entry, an exit registration and computing unit into which tokens are placed on exit, which assesses the journey covered by the passenger and a display device for indicating the assessment.

A second entry registration unit may also be provided for recording on previously obtained tokens the fare stage zone of entry.

One embodiment of the invention will now be described by way of example with reference to the accompanying drawings in which.

Throughout the description of this embodiment it is to be understood that the apparatus deals with three distinct types of token, namely, those issued to casual travellers, those issued to account travellers and those issued by the apparatus to prepaid travellers. Throughout this description and the claims, tokens of the kind issued to casual travellers will be referred to as "casual tokens," tokens of the kind issued to account travellers will be referred to as "account tokens" and tokens issued to prepaid travellers will be referred to as "prepaid tokens."

All the tokens are provided with means whereby recordings can be made thereon and be read therefrom by the apparatus. In this context use may be made of electrical, chemical or magnetic properties of substances provided on or forming part of the tokens and in the present embodiment the tokens are provided with a plurality of magnetic tracks. It is a feature of this embodiment that all three types of token may vary only in the number of tracks used and thus assist in their application to one type of apparatus. The recordings on the different types of token will become apparent hereafter.

Figure 1:
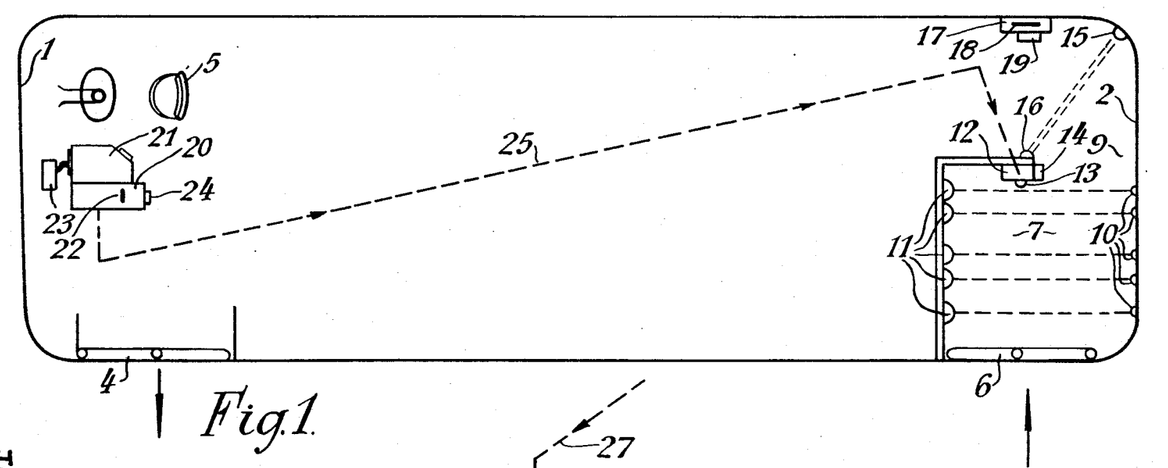
FIG. 1 shows diagrammatically the principal elements of an apparatus according to the embodiment as applied to an omnibus or coach.

Referring now to FIG. 1, there is shown diagrammatically the layout of an omnibus having a front end 1 and a rear end 2. An exit door 4 is positioned at the front end of the vehicle adjacent the driver's seat 5 and an entry door 6 is positioned at the rear of the vehicle.

The entry door 6 opens into an entry section 7 of the vehicle which is partitioned off from the remainder of the vehicle by a partition 8 leaving a restricted passage 9 for entry into the vehicle proper.

Photoelectric devices having transmitters 10 and receivers 11 are provided in the entry section 7 to warn the driver of the vehicle that passengers are still boarding the vehicle or are in the entry section 7.

Also provided in the entry section 7 is a casual token issuing apparatus or first entry registration apparatus 12 operable by a push button 13 to dispense tokens into a chute 14. When a traveller has obtained a token and passes into the vehicle proper, his passage is sensed by a further photoelectric device having a transmitter 15 and receiver 16.

A second entry registration apparatus 17 is provided (shown for convenience within the vehicle proper but normally situated in the entry section 7) for use by passengers having account or prepaid tokens which are inserted in a slot 18, pass through a registration procedure therein, and are then returned to the passenger by the chute 19.

Adjacent to the driver is an exit registration unit 20 and a computing unit 21. Passengers of all types wishing to alight from the vehicle place their tokens in the slot 22 in the registration unit 20. From information contained on the token, the computing unit 21 calculates the journey which the passenger has made and subtracts the necessary value from returnable tokens, i.e., account and prepaid tokens, and indicates on a display device 23 the journey length or the fare to be paid by the casual traveller. Returnable tokens are returned to the passenger by a chute 24 and the casual tokens are returned to the token issuing apparatus 12 by a pneumatic conveyor diagrammatically indicated by the broken line 25.

The operation of the units 12, 17, 20 and 21 will be described in greater detail hereafter with reference to FIGS. 3 and 4 and, as will become apparent therefrom, these units, as well as performing charging functions, perform checking functions to determine validity of tokens being used, so as to prevent fraud.

Figure 2:
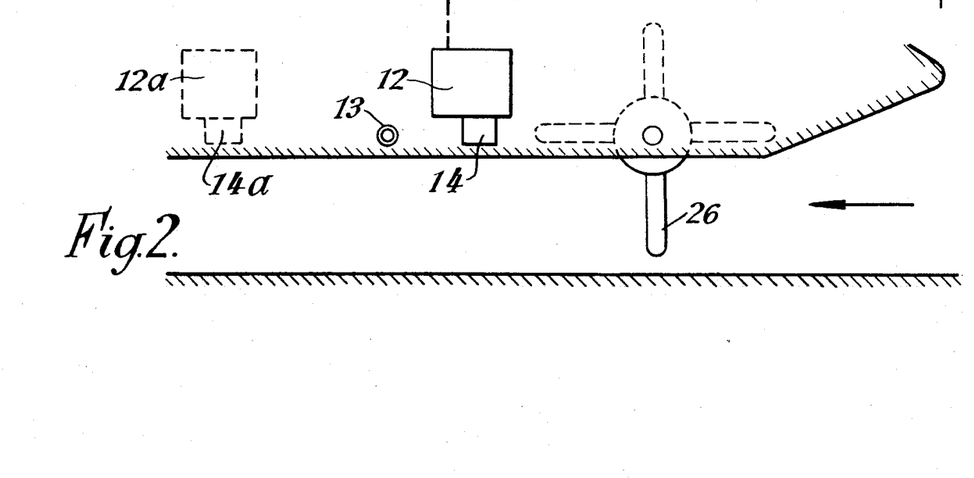
FIG. 2 shows diagrammatically the arrangement of certain elements of an apparatus according to this embodiment as applied to the entry to a railway platform.

FIG. 2 shows diagrammatically the arrangement of the entry registration apparatus at, for example, a down escalator in a subway station. In the direction towards the trains, the passenger first passes a free turnstile 26 and thereafter the first registration unit 12 with its associated push button 13 and dispensing chute 14. The broken line unit 12a represents an alternative position of the unit 12 or may represent a unit 17. The exit units can be the same as units 20 and 21 with the possible exception that the computing unit 21 may serve more than one unit 20. Pneumatic return of the casual token is indicated at 27, but in this case the return will be from a unit 20 at the same station and not at the original boarding station.

Figure 3:
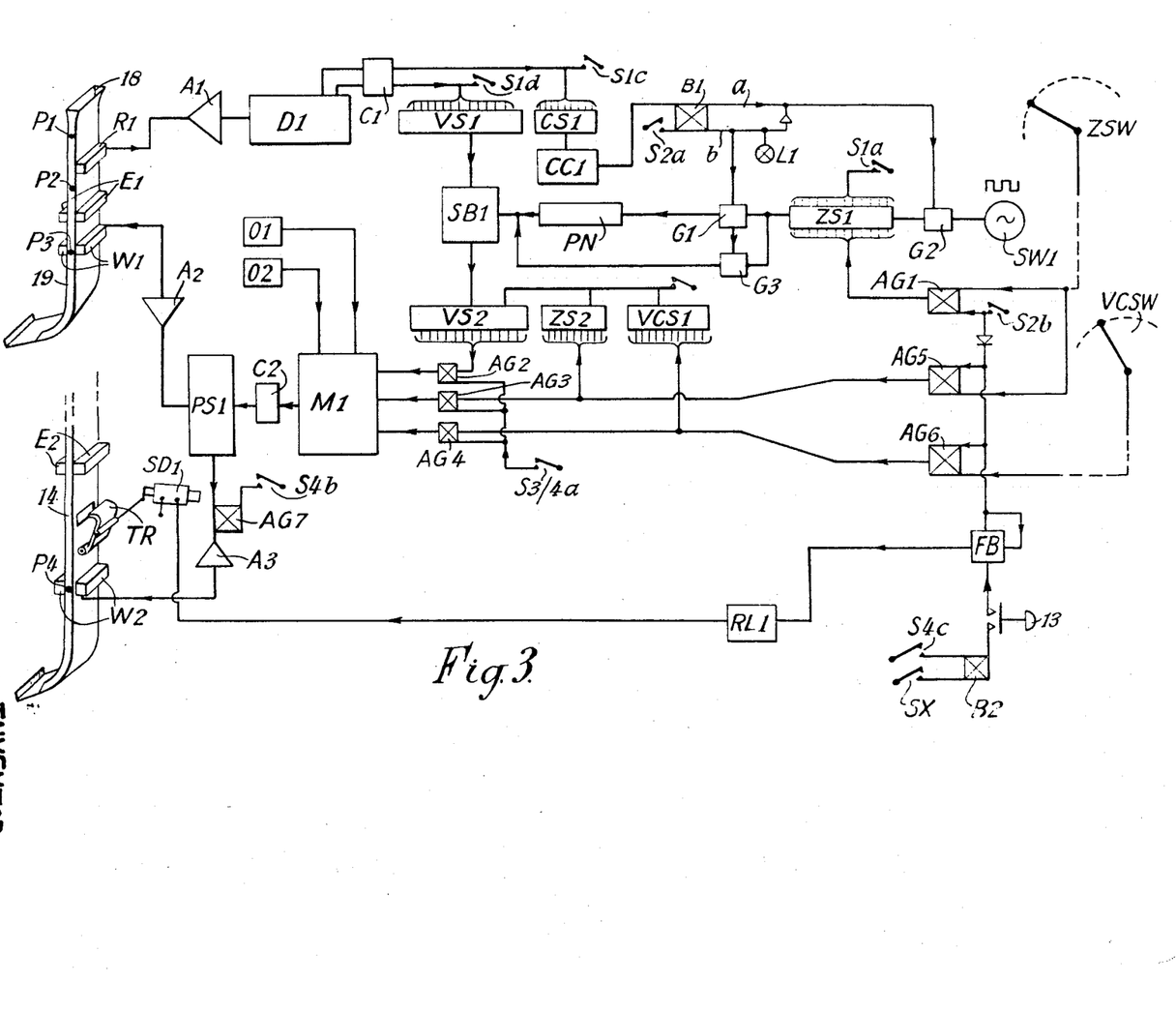
FIG. 3 is a block diagram of the apparatus at the entry point of a vehicle.

Referring now to FIG. 3, there is shown a block diagram of the apparatus of the entry registration units 12 and 17. In this figure the entry slot 18 of the registration unit 17 is shown and, as can be seen, this slot is the beginning of the chute 19. Also shown is the chute 14 of the unit 12 and the operating button 13 thereof.

The entry apparatus appertaining to prepaid and account tokens will first be considered:

This apparatus comprises the chute 19 having three photoelectric devices P1, P2 and P3, which sense the passage of the token for a purpose to be described. The chute 19 is also provided with multiple reading heads R1, erase heads E1, and writing heads W1.

The reading heads R1 will read information from the token which information is, in this embodiment, in the form of frequency modulated oscillations recorded on parallel tracks on rectangular tokens. The reading heads will read from the token the token value number, which is a number indicating the value of the token, and also a check number which has been recorded thereon by an exit registration unit during a previous journey, and serves to show that the token was properly registered at the end of the last journey.

The output from the reading heads R1 is passed through an amplifier unit A1 and a demodulator unit D1 from where the information is fed in the form of D.C. pulses to a value number binary store VS1 and a check number binary store CS1. The store units are memory registers, used extensively in the computer art, which store binary numbers and are described as shift registers. In order to ensure that the correct information gets to the correct store, even if a token is inserted in the slot 18 upside down or back to front, a correction unit C1 is provided which will, where necessary, transpose tracks and individual signals.

The check number signals in the store CS1 are compared by a comparator unit CC1 with a predetermined check number contained therein. The output from the comparator unit CC1 is fed to a bistable circuit B1. The circuit B1 produces an output, on the operation of a switch S2a which is operated by the photoelectric device P2, when there is a discrepancy indicated by the comparator unit CC1 and this output appears at $b$ and illuminates indicator lamp L1. If there is no discrepancy the output appears at $a$.

If the voltage appears at $b$, gates G1 and G2 become conductive and gate G3 becomes non-conductive, causing the contents of a zone or fare stage number store ZS1 and a penalty number from a unit PN to be shifted by the square wave generator SW1 to a subtractor unit SB1. The zone or fare stage number stored in ZS1 is provided by a driver-controlled switch ZSW by way of an "and" gate AG1. The opening of the "and" gate AG1 is controlled by the photoelectric device P2 operating the switch S2b. The switch ZSW is set by the driver at every new zone or fare stage and the output of this as applied to the bits of the store ZS1 represents the value number of that zone or stage. The unit PN provides a further value number to provide a penalty for not registering the token on a previous journey.

If the voltage appears at $a$, gate G3 conducts and only the contents of ZS1 is shifted to the subtractor unit SB1. The subtractor unit SB1 thus subtracts from the value number in the store VS1, the value number from the store ZS1 representing the cost of a journey from the entry of the passenger to the terminus or an imaginary point therebeyond and also, where applicable, the value number from PN. This processed value number is then stored in the value number store VS2.

The token, after passing the reading heads R1, passes erasing heads E1 on both sides of the chute, which erase from the token all the information on the token except, in the case of an account token, the owner's identification. Further motion of the token actuates the photoelectric device P3 operating a switch S3/4a which in turn actuates "and" gates AG2, AG3 and AG4. Gate AG2 transfers the value number of the store VS2 to a modulator unit M1 fed by two oscillators 01 and 02 providing oscillations of two frequencies representing 0 and 1 states of the binary number system. Gate AG3 transfers the entry zone number from a store ZS2 to the modulator unit M1 and gate AG4 transfers to the modulator unit M1 a vehicle check number from a store VCS1. The store ZS2 is supplied with the zone number from the switch ZSW by way of "and" gate AG5 and the store VCS1 is supplied with a check number by a switch VCSW by way of "and" gate AG6. This number may represent the vehicle route. The operation of the gates AG5 and AG6 is controlled by switch S2b.

The output of the modulator unit M1 is fed through a second correction unit C2 which provides the reverse action of the correction unit C1 from which the output passes through a signal sequencing unit PS1 and through an amplifier A2 to the writing heads W1 to record the information on both sides of the token. The token then moves to the bottom of the chute 19 to be returned to the passenger. The various information stores are reset when the next toekn operates P1, by switches S1a, S1b, S1c and S1d which apply a resetting voltage to all the stores, operated thereby.

The entry apparatus appertaining to casual tokens will now be considered:

This apparatus consists of a chute 14 leading from a token store not shown. The chute 14 is provided with erase heads E2, writing heads W2, a photoelectric device P4, and a token retaining member TR.

To obtain a token, the button 13 is depressed and operates "and" gates AG5 and AG6 to supply information to the stores ZS2 and VCS1. Also, the operation of button 13 actuates a relay RL1 to operate a solenoid SD1 operating the token retaining member TR to allow the lowermost token in the stack to pass down the chute 14. Tokens arriving at the lowermost position have any information thereon erased by erase heads E2 on both sides of the chute.

As the token passes the photoelectric device P4 it causes operation of switches S3/4a, S4b and S4c. Switch S3/4a operates, as before, "and" gates AG2, AG3 and AG4, only gates AG3 and AG4 being useful in this case. Thus, the outputs from ZS2 which gives the entry zone data and VCS1 which gives the vehicle check number pass to the modulator M1 and through correction unit C2 and pulse sequencing unit PS1. Switch S4b operates "and" gate AG7 to permit the output from PS1 which is the Pulse Sequencing Unit, to be passed to amplifier A3 and the writing heads W2 to record the information on both sides of the token. The token then passes to the bottom of chute 14 for collection by the passenger.

To prevent simultaneous operation of both chutes 14 and 19, a short period feed back suppressor FB is incorporated in the feed line from the push button 13. If the button 13 happens to be depressed at the same time as the photoelectric device P2 is operated and a voltage appears on the "and" gates AG1, AG5 and AG6, the voltage on these gates will suppress the path for the voltage coming from the contacts of the button 13 for a fraction of a second allowing the cycle of the chute 19 to be completed before the relay RL1 is energised.

The voltage supply to the push button 13 is controlled by way of a bistable circuit B2 whose operation is controlled by switch S4c operated by photoelectric device P4 and by switch SX operated by photoelectric device 15, 16 (see FIG. 1). A pulse from SX sets the bistable B2 to allow a voltage input to the contacts of the button 13. With the bistable B2 in this condition, when the button 13 is pressed, the lowest token is released and operates P4 and S4c to change the state of B2. Only when the bistable B2 has been reset by another pulse from SX will a further token be issued on pressing button 13.

Figure 4:
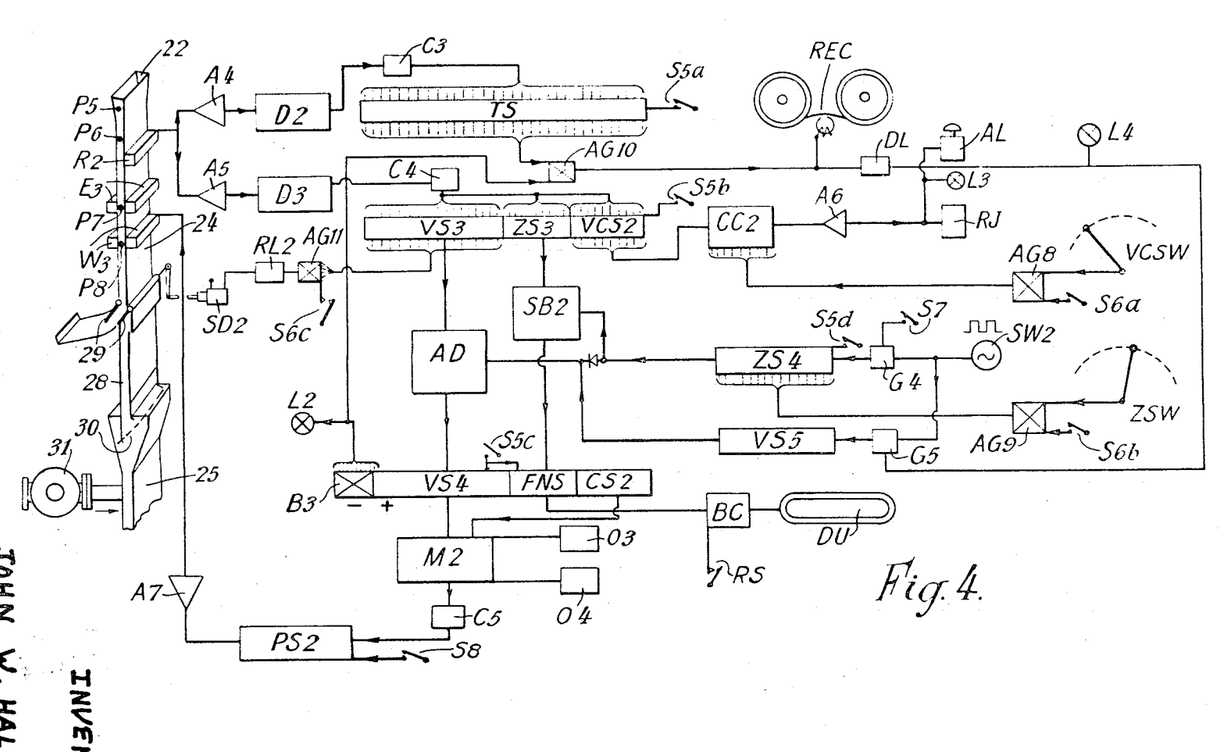
FIG. 4 is a block diagram of the apparatus at the exit point of a vehicle.

Referring now to FIG. 4, there is shown a block diagram of the exit registration unit 20 and computing unit 21. In the figure the entry slot 22 of the unit 20 is shown and as can be seen, this slot is the beginning of the chute 24 and the chute is seen continuing by an extension 28 into the beginning of the pneumatic conveyor 25 for return of casual tokens.

The chute 24 is provided with photoelectric devices P5, P6, P7 and P8 and reading heads R2, erase heads E3 on both sides of the chute and writing heads W3 also on both sides of the chute.

The exit registration arrangements as appertaining to account and prepaid tokens will first be described:

The account or prepaid token is inserted into the slot 22 and actuates the photoelectric device P5 which in turn operates switches S5a, S5b, S5c and S5d, to perform resetting operations similar to that performed by switches S1a and S1b in FIG. 3. The token then passes P6 which operates switches S6a, S6b and S6c. Only switches S6a and S6b are applicable in this case and operate to energise "and" gates AG8 and AG9 to set stores CC2 and ZS4 from switches VCSW and ZSW, respectively (see also FIG. 3).

Reading heads R2 then read off the data from the tokens, the output of the heads being divided into two, one output proceeding via amplifier A4, demodulator D2 and lane correction unit C3 to the account token number store TS which stores the owner's number from account tokens and the other output proceeding via amplifier A5, demodulator D3 and lane corrector C4 to the token value number store VS3, the zone number store ZS3 and the vehicle check number store VCS2.

The check number from the store VCS2 is compared with the check number derived from the switch VCSW in the comparator CC2. The comparator CC2 produces no output where the check numbers are in agreement, but when a disagreement takes place, an output is provided by way of amplifier A6 to a reject circuit RJ, thus causing ejection of the token and operation of the alarm bell, AL and illumination of light L3.

The token then passes photoelectric device P7 and erase heads E3 which erase the signals recorded on both sides of the token except for the account number of account tokens. Operation of P7 operates the switch S7 to open gate G4 and allows the square wave generator SW2 to pulse the contents of the store ZS4, partly into an adding unit AD which adds the contents of ZS4 to the contents of store VS3 to provide a new value number in store VS4, and partly into a subtracting unit SB2 to subtract the contents of ZS4 (which is the zone storage unit) from the contents of ZS3 to provide a fare number in store FNS. The store FNS is linked to a binary decimal converter BC which energises a digital display unit to display the fare deducted.

When the token passes the photoelectric device P8 a switch S8 is energised to operate a signal sequencing unit PS2 and permits the output of a modulator M2 to be conveyed to the reading heads W3 by way of unit PS2 and amplifier A7 by means of which heads a record is made on both sides of the token. A lane corrector C5 is also provided between the modulator M2 and the unit PS2.

The modulator M2 is fed by oscillators 03 and 04 and is provided with an input from the value number store VS4 and from a fixed binary store CS2 which provides a signal for recordal on the token to indicate that the token has been properly registered. This signal is that which is compared in the unit CC1 of FIG. 3 at the next entry.

If, however, the new value in the store VS4 is negative, this is indicated by a light L2. Where the token is an account token, the output of a negative bistable circuit B3 provided in the store VS4 goes to an "and" gate AG10 connected with the output line of the account token number store TS transferring this information to a multi-head tape recorder REC which records the account token number. After a short delay provided by delay unit DL, a voltage is applied to a gate G5 permitting the pulse generator SW2 to pulse out a renewal number store VS5 by which the depleted value in VS4 is increased by a fixed amount corresponding to a convenient monetary value. Also at the same time a lamp L4 lights to indicate that the addition of one unit has been recorded. This renewal must take place before the token passes P8 to enable the new value to be recorded on the token.

In the case of prepaid tokens, no number is present in TS so that no recording is made. The token can, however, be renewed in the same way by payment either to the driver or to an automatic machine provided for the purpose. Alternatively a new prepaid token can be purchased.

The exit registration arrangements appertaining to casual tokens will now be described:

The casual token is inserted in the slot 22 and actuates P5 to reset the store units and P6 to operate switches S6a, S6b and S6c. Switches S6a and S6b operate as previously to set stores CC2 (comparator unit) and ZS4 (Zone Store) and S6c operates "and" gate AG11 for a purpose to be described. The reading heads R2 record the token's information which is fed by amplifier A5, demodulator D3 and lane correction unit C4 into stores ZS3 and VCS2 as before. No information will be stored in VS3 in this case as the casual tokens operate only with a zone number and a check number. The absence of the information in VS3 will actuate relay RL2 by way of gate AG11 to operate the solenoid SD2. This moves the diverter plates 29 from the position shown to a position to allow the token to proceed into the extension 28.

The processing of the data with regard to the fare to be paid and the validity of the token operates in the same way as with the prepaid tickets and the fare to be paid is displayed on the unit DU which is reset either automatically or manually by a switch RS.

The token thus passes through the chute as before and passes into the extension 28, through a one-way flap 30 and into the pneumatic conveyor 25, the pump for which is shown at 31. The passenger pays the driver of the bus or an automatic machine the fare indicated on the unit DU.

For the casual token, the erase heads E3 and writing heads W3 may be appropriately disconnected as these are not required. However, in order to cut down on extra circuitry, they may operate as before and the information recorded by the writing heads W3 will then be erased by the erase heads E2 (FIG. 3).

It will of course be appreciated that although the block diagrams of FIGS. 3 and 4 have been described for vehicles, they may equally well apply to stations.

The operation of the apparatus will now be described in general form with reference to the logical sequence diagram of FIG. 5. It is to be understood that this diagram represents the operation of apparatus of many forms which carry out the desired features of the invention and is not limited to the operation of the apparatus described with reference to FIGS. 3 and 4 which is only one example of apparatus designed for this purpose.

The operation will be described with reference to each type of passenger.

1. Account passengers

The account passenger boarding the vehicle is shown at p1. This passenger has a token $t1$ which he inserts into an entry registration unit RIN. Here the token $t1$ is checked for the indication that it was exit registered at the end of the previous journey. If this check is satisfactory, an output is provided to a unit $g1$ which activates sub-units $vs$ which is a vehicle route identification store and $fs$ which is a store providing a number representing the number of fare stages to the forward terminal of the route. $vs$ is set by a switch $vn$ and $fs$ is set by a switch $fn$ both positioned adjacent the driver's seat.

The information in the stores $vs$ and $fs$ are thus transmitted to the unit $c1$ and are recorded on the token $t1$ which is returned to the passenger as at $t2$.

However, if the check is unsatisfactory unit $pe$ is actuated to illuminate lamp $l1$ and cause the unit $c1$ to add a penalty number to the number from $fs$. This has the effect of moving back the entry point for fare calculating purposes and the lamp $l1$ notifies the passenger of this.

Line $p1t3$ indicates the passenger on board with his token. When the passenger wishes to alight he inserts his token in an exit registration unit REX and here the vehicle route number as recorded from store $vs$ is checked. If this check is unsatisfactory it indicates that the token is not the same as that registered on entry and it is ejected as at $t4$. At the same time light $l2$ lights and the alarm bell $a$ rings.

If the check is satisfactory, unit $c2$ calculates the travelled stages and displays this information on a screen $d$. At the same time this result is deducted from the token value and the vehicle route number is replaced by a genuity code number which will signify correct exit registration when checked at the beginning of the next journey. The token is then returned to the passenger at $t5$.

When the accumulated consumption of travel fare stages reaches a certain bulk monetary value, unit $c2$ provides an output signal to a unit $id$ which corresponds to the code representing the token owner, which representation is permanently recorded on the token. Unit $id$ is a credit number identification unit and on receiving the output from $c2$ records the identification number on a recorder $r$. At the same time it causes reduction of the consumed fare stages on the token by a number corresponding to the above mentioned bulk monetary value and light $l3$ is is illuminated to indicate this to the passenger. After the revaluation of the token, the token is returned to the passenger as at $t6$.

2. Prepaid passengers

The prepaid passenger has a token similar to that of the account passenger except that there is no ownership number associated therewith. The prepaid token is used in exactly the same way as the account token except with regard to the procedure when the value of the token becomes used up. Thus, when a prepaid token is inserted in the exit registration unit and the amount calculated by the computing unit $c2$ is greater than the available value of the token, the token must be renewed. Since there is no ownership number, the unit id does not operate.

The token may be renewed by payment to the driver or an automatic machine. Alternatively a new token can be purchased.

3. Casual passengers $p2$ represents a casual passenger having no ticket. He boards the vehicle and presses the button 13 of the unit 12, causing the contents of the stores $vs$ and $fs$ to be recorded on the lowermost token of the stock of tokens in the unit ST which is then supplied to the passenger by the chute 14 as then indicated at $t7$.

Figure 5:
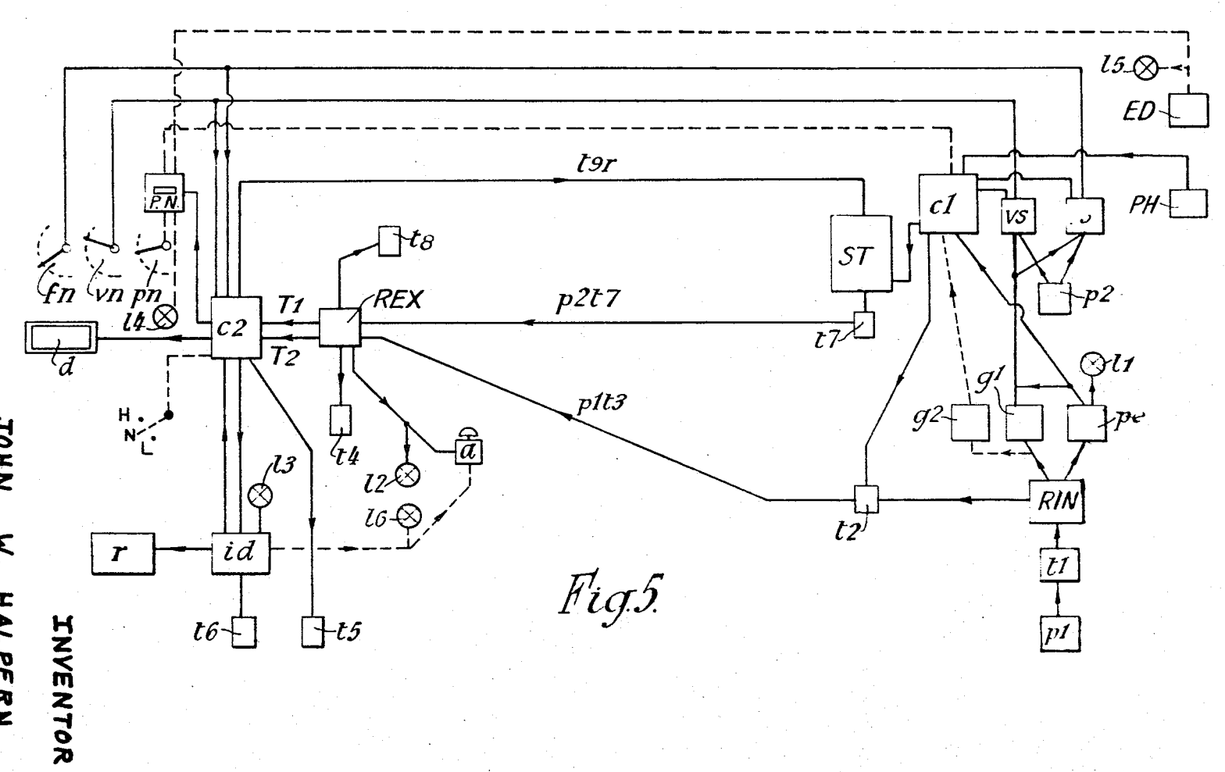
FIG. 5 is a logical sequence diagram showing the use of the apparatus shown in FIGS. 1 and 2 with respect to the three main categories of traveller.

No further tokens will be issued by the stacking unit until the first passenger $p2$ has entered the bus proper and this is sensed by the photoelectric device 15, 16 and indicated in FIG. 5 by PH.

The passenger then remains in the vehicle as indicated by the line $p2$ $t7$ until he wishes to alight when he places his token in the exit registration unit REX.

In the unit REX the token is checked for the vehicle route number from $vs$. If this check is unsatisfactory it indicates that the token is not the one issued at entry and it is accordingly rejected as at $t8$. If this check is satisfactory the unit $c2$ then calculates the fare by subtracting from the zone number originally supplied by unit $fs$ a new zone number provided by the switch $fn$ which is, of course, now set to the exit zone. The calculated fare is then displayed on the unit $d$ and the passenger pays either the driver or an automatic machine.

The token is then returned to the stack unit ST by pneumatic conveyor 25 as indicated by the line $t9r$ to be used again.

The diagram of FIG. 5 also shows further ancillary apparatus which may be used but which have not been previously described and which, although not necessary to the operation of the main apparatus provide additional services.

One such ancillary apparatus controls the number of passengers permitted on the vehicle. This consists of a unit PN which couples both to units $c1$ and $c2$. By means of these two units, the unit PN is able to determine the exact number of passengers in the vehicle and the permissible number of passengers, which may, of course, vary with traffic conditions, is set by a driver-operated switch $pn$. When the vehicle is full a driver's warning light $l4$ and a light $l5$ over the entry door illuminates and, where pneumatic doors are used, these are locked closed by a unit ED.

Another apparatus consists in allowing different rates of charging to be carried out in $c2$ and includes a driver-operated switch $vc$ having for example three positions "high" (H) "normal" (N) and "low" (L). Thus the charging rate may be varied for various purposes such as to encourage passengers to travel outside high density periods.

Still another apparatus provides for checking the genuity of the owner's number on an account token which if incorrect lights a warning lamp $l6$ and operates the alarm bell $a$.

A further apparatus includes a unit $g2$ for checking the number of times a token has not been registered at exit and increases the penalty accordingly.

It will be understood that while the diagram of FIG. 5 is particularly applied to vehicles, it also operates for stations where both $fn$ and $vn$ can be fixed or only varied when a reorganisation of the charging rates, etc., is carried out.

It will be appreciated that various modifications can be made to the above described embodiment without departing from the scope of the invention. For example, instead of a single chute at the registration apparatus, two chutes would be used, one for account and prepaid tokens and the other for casual tokens.

At stations several registration chutes may be controlled by a single computor unit.

Also the calculation of the fare payable or deductible as the case may be, may be carried out by calculating the distance between exit and entry zones and thereafter subtracting this value from the token value. A unit may be provided for varying the deductions from the values of tokens depending on the length of journeys, time of day, or the use of privilege tokens.

What I claim is:

1. Fare charging apparatus for a common carrier, comprising :
   a. a carrier token having storage means for storing data on the token including data reflecting a number identifying the token
   b. means for generating a signal reflecting a fare charge for the trip
   c. means for producing on the fare token a record of the sum of fare charges arising from consecutive trips expressed as a number relative to a first fixed reference number, together with means for defining said first reference number.
   d. means for detecting when any individual fare charging operation causes the aggregate fare to increase from a value short of a second reference number to a value in excess of that second reference number, together with means for defining that number.
   e. means responsive to detector output signals causing the token identifying number to be transferred to a permanent memory of the common carrier.

2. Fare charging apparatus for a common carrier as set out in claim 1, wherein :
   a. the storage means on the common carrier token include data reflecting a reference number against which aggregating fare data are to be measured.

3. Fare charging apparatus for a common carrier as set out in claim 1 wherein :
   a. the storage means on the token hold data relating to an entrance point on the common carrier
   b. the fare charge means comprise an encoder device for encoding numbers allotted to zone areas, routes and discrete locations covered by the common carrier
   c. signal generating means for producing electrical signals representative of the encoded area, zone and location 4. Fare charging apparatus for a common carrier as set out in claim 3, including :
   a. means for producing a difference signal reflecting the difference between entrance data read from the carrier token and the exit data generated by the signal generating means,
   b. fare rate charging means for receiving the difference signal and applying a fare rate charge thereto for generating the fare charge signal.

5. Fare charging apparatus for a common carrier as set out in claim 1, including :
   a. sensor means for reading from the carrier token a fare charge aggregate arising from preceding trips,
b. data processing means associated with the sensor means
c. means for recording on the data storage means of a carrier token data reflecting the charge to be made for the trip on a common carrier plus the aggregate fare charge that has arisen from fare charges on preceding trips.

6. Fare charging apparatus for a common carrier as set out in claim 5, including :
a. a sensor to read from a carrier token a mark indicating that a charge has been made for the preceding trip
b. detector means for assessing whether or not such a mark had been recorded on the storage means of the carrier token
c. a register as part of the token processor means to store a preset penalty number
d. means responsive to detector output signals causing the data in the penalty register to be added to the aggregate fare charge data prior to recording onto the carrier token.

7. Fare charging apparatus for a common carrier as claimed in claim 1, comprising :
a. means for reading an identifying number from the token , and comparator means ( CC1, TS ) for assessing its validity
b. comparator output circuits generating a signal applied to the controlled exit gate to ensure unimpeded passage by the patron owning said identified token.

8. Fare charging apparatus for a common carrier as claimed in claim 7 in which :
a. the exit gate is normally open and the signal instructing the gate to close is derived from a photo-electric device activated as a patron approaches the gate and causing the gate to close unless a prior cancelling output is produced by the comparator making the closing instruction ineffective so that the controlled gate remains open thus providing unimpeded passage for the patron.

9. Fare charging apparatus for a common carrier comprising :
a. a carrier token having magnetically responsive storage means for storing data on the carrier token including data reflecting a number identifying a token account and entrance data of the user on the common carrier
b. sensor means for reading the data on the token storage means
c. data processing means including registers to receive and hold the signals received from the sensor means
d. means including registers for generating exit data signals reflecting the exit point of the passenger from the common carrier
e. comparison means as part of the data processing means connecting to registers holding entrance and exit data for producing a differential electrical signal
f. fare rate charging means for receiving the differential signal and applying a fare rate charge thereto to produce a fare charge signal
g. data recording means connected to fare charge means and to identity data storage means for transferring to a permanent memory (owned) of the common carrier a fare charge value as well as the number identifying the token account.

* * * * *